Nov. 14, 1961   J. A. WELLER   3,008,279
PACKAGING MACHINE
Filed Oct. 16, 1959   4 Sheets-Sheet 2
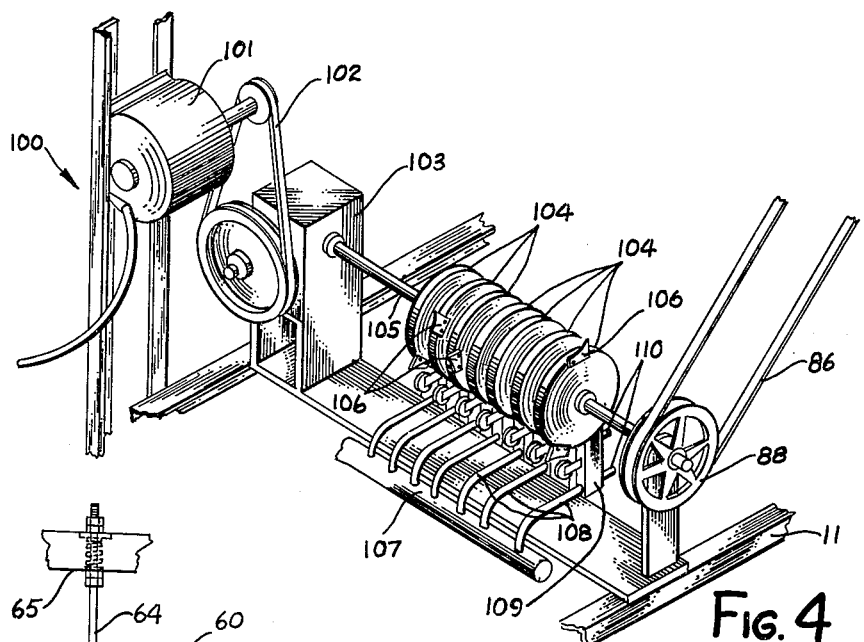
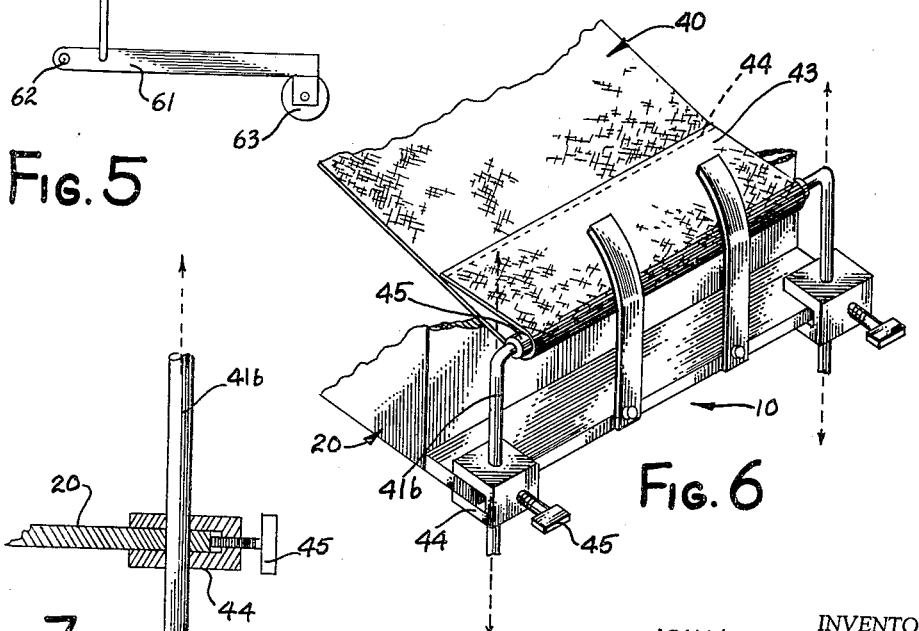
INVENTOR
JOHN A. WELLER
BY
ATTORNEYS Nov. 14, 1961  J. A. WELLER  3,008,279
PACKAGING MACHINE
Filed Oct. 16, 1959  4 Sheets-Sheet 3

INVENTOR
JOHN A. WELLER
BY
ATTORNEYS

Nov. 14, 1961 J. A. WELLER 3,008,279
PACKAGING MACHINE
Filed Oct. 16, 1959 4 Sheets-Sheet 1
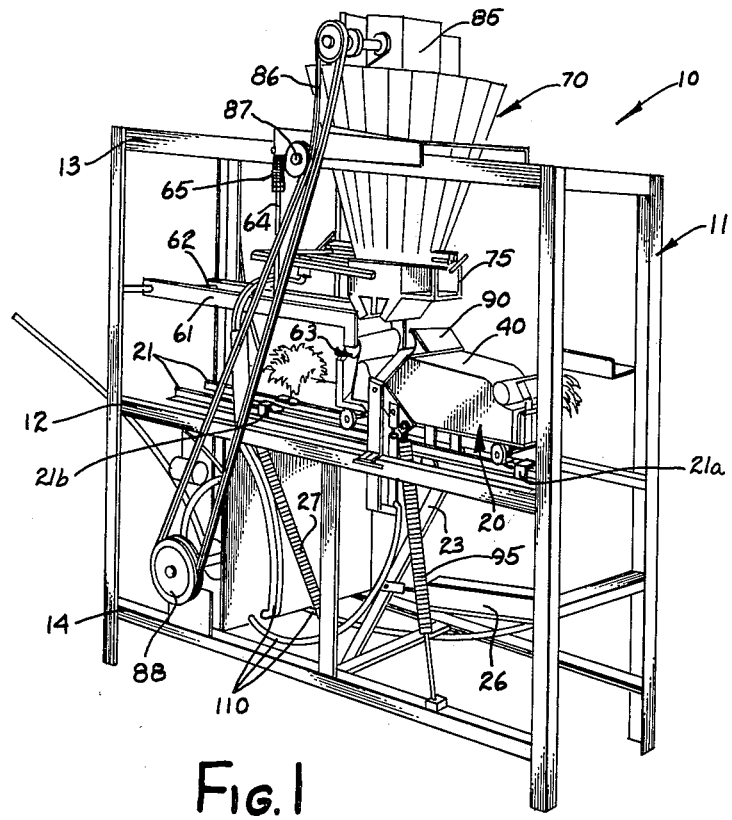
Fig. 1
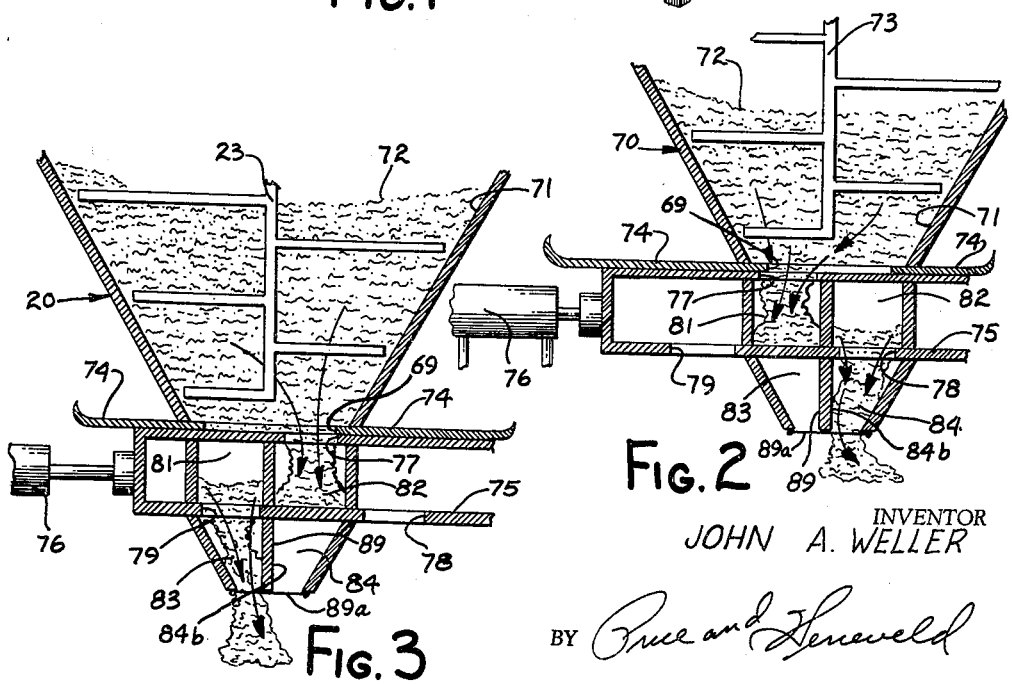
Fig. 2
Fig. 3
INVENTOR
JOHN A. WELLER
BY *Price and Heneveld*
ATTORNEYS

# United States Patent Office 3,008,279
Patented Nov. 14, 1961

3,008,279
PACKAGING MACHINE
John A. Weller, P.O. Box 501, Holland, Mich.
Filed Oct. 16, 1959, Ser. No. 846,841
14 Claims. (Cl. 53—215)

This invention relates to packaging machine, generally, and more particularly to plant packaging equipment.

Nursery plants, bushes, shrubs, etc., require very careful handling and packaging between the time they are removed from the ground and are replanted. It is particularly important to keep the roots of such stock reasonably moist to maintain a healthy plant life and not unduly retard the growth of the plant. It is also important to protect the root structure from damage or injury. This is usually accomplished by "potting," "bagging" or hand wrapping the plant stock in tar paper pots or burlap bags with dirt or peat moss, separately or in combination. The process is a slow one and requires care so that the foliage of the plant is not damaged or injured in the process.

Nurserymen have long attempted to use packaging machines for wrapping their plants prior to storage or shipment. To my knowledge all of these machines are hand operated requiring the operator to perform a number of sequential steps which is slow and tiresome. Further, these packaging machines do not uniformly wrap the plant roots and frequently damage results to the plant because of mishandling.

It is herein proposed to make use of a reciprocal carriage formed to include a work bed platen. Forward movement of the carriage forms and rolls the package. Backward movement brings the package to point where it can be removed and the carriage to position for starting another package. A wrapping apron is mounted on the carriage and is cooperatively associated with a stationary roller. The apron is formed to include a pocket within which the plant wrapper, plant root covering, and plant are received. Means is provided for automatically depositing the plant root covering in the pocket. After the root structure is covered and the covering material is compacted about the roots, the carriage is reciprocated relative to the roller so that the pocket in the apron travels across the apron and over the work platen of the carriage. This causes the plant to be wrapped very quickly and uniformly. Roots are tightly packed without damage. Compared to hand wrapping it is done more quickly and without the tiring effort of applying pressure while rolling and results in the use of much less cover material. Adjustable features permit application to many varieties of plants and roots with resulting uniformity of package so that standardized sizes of shipping and display containers are possible.

The proposed machine will automatically insert and pack the plant roots in a tight cylindrical cluster of moist packing material suitable for life and growth and encase the material in a waterproof covering which can also be attractive display material.

The actuation of the reciprocal carriage and the cooperation between the carriage, work apron and roller are significant contributions to a more satisfactory plant packaging machine. The means shown and described for retaining the wrapped plant accessible on the carriage while the work apron is relaid on the carriage is also significant. Other noteworthy features include the mounting of the stationary roller, the simplicity of the means for adjusting the work apron tension, the structure of the apron pocket supports and work apron support which facilitates the proper wrapping of the plant, the feed hopper use to meter and deposit peat moss in the apron pocket, and the air actuated timed sequence of operations which provides a fully automated plant packaging machine.

It is an object of this invention to disclose an efficient and relatively inexpensive packaging machine.

It is an object of this invention to disclose a plant packaging machine which will effectively cover and protect the roots of a plant for subsequent storage or shipment.

Another object of this invention is to provide a plant packaging machine in which the chance of damage to the plant roots and foliage is minimized appreciably.

Still another object of this invention is to disclose a semi-automated plant packaging machine which will prepare to receive a plant wrapper and root covering and thereafter will package and deposit the packaged plant for subsequent transfer to storage.

A further object of this invention is to provide efficient means for handling different grades and coarseness of moisture retaining material, such as peat moss, in combination with the proposed packaging machine.

A still further object of this invention is to disclose pocket forming means and means for cylindrically balling moisture retaining material about the roots of a plant; such means being operable separately and yet provided in combination.

An additional object of this invention is to provide a packaging machine adapted to be adjusted for different size packages and for different tightnesses of the package.

These and other objects and advantages in the practice of this invention will be more apparent in the illustration and description of a working embodiment of the invention, as hereinafter set forth.

In the drawings:

FIG. 1 is a perspective view of the proposed packaging machine.

FIG. 2 is an enlarged fragmentary cross section of the feed hopper and feed control of the disclosed machine.

FIG. 3 is an enlarged cross sectional and fragmentary view of the feed hopper shown in FIGS. 1 and 2 with the feed control mechanism in a different position.

FIG. 4 is an enlarged perspective view of the sequence and control mechanism for the air-driven power members of the disclosed machine.

FIG. 5 is an enlarged side plan view of the roller assembly of the proposed machine.

FIG. 6 is an enlarged perspective and fragmentary section of a detail part of the proposed machine.

FIG. 7 is a further enlarged cross sectional view of one part of the detail shown by FIG. 6.

Figure 12:
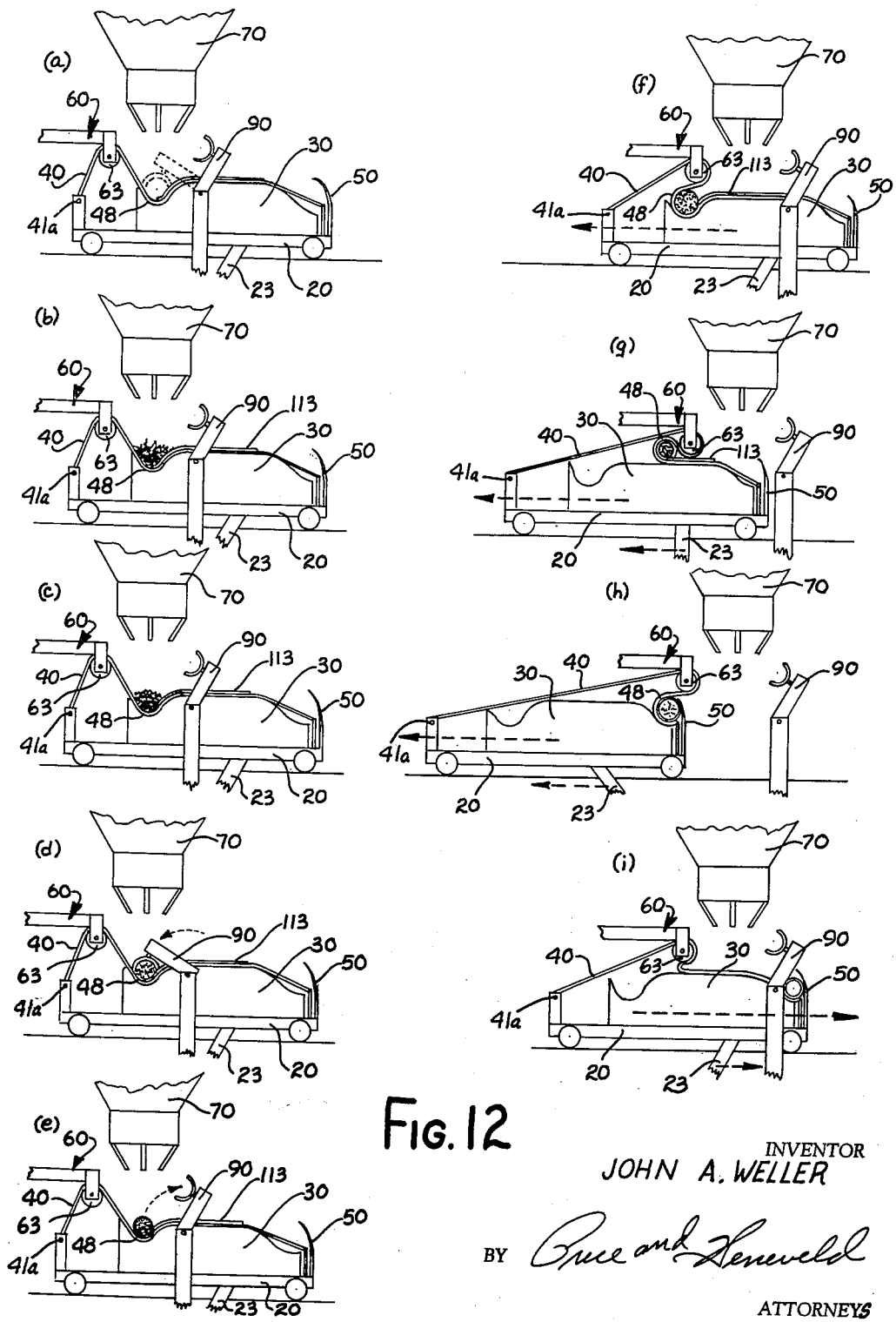

FIG. 12, views (a) through (i), is a diagrammatic sequence illustration of the manner in which work is performed by the disclosed packaging machine.

Figure 13:
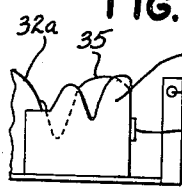

FIG. 13 is a side elevational view of a fragment of the carriage showing one of the side plates.

Figure 14:

FIG. 14 is an end view of a fragment of the carriage.

In brief, the machine of this invention is particularly useful for plant packaging purposes. The machine includes a supporting frame which has guide rail tracks provided thereon at work table height. A reciprocal carriage is mounted on the guide rails. The carriage includes a work bed platen and is provided with a wrapping apron secured to the ends of the carriage and laying over the work platen thereof. A roller is mounted on the machine frame and is disposed near the end of the carriage in its retracted position. The roller is adapted to receive the wrapping apron thereover. Means are provided for forming a work receiving pocket within the apron between the roller and the end of the work bed platen of the carriage.

A feed hopper is provided on the machine frame and is disposed at a position to dispense packaging material into the pocket formed in the work apron.

The machine is sequenced to have a pocket formed in the apron, to receive some packaging material within the pocket prior and subsequent to the receipt of an object to be packaged therein, to compact the packaging material about the object, to have the carriage advance under the roller for closing the pocket and rolling the object relatively within the packaging material and wrapper as the pocket is advanced over the work bed platen of the carriage and towards the other end thereof. The packaged item is deposited in means provided on the end of the work carriage and is held there while the carriage is returned and the wrapping apron is relaid over the work bed platen of the carriage member.

Referring to the drawings in further detail, the packaging machine 10 is shown in FIG. 1 to include a framework 11. The machine frame 11 provides a central work table area 12, overhead feed hopper supports 13 and motor and control supports 14 below the work table.

A carriage member 20 is provided within the central work table area 12. The carriage 20 is supported upon guide rails 21 by means of two sets of guide wheels 22a and 22b (FIG. 9) secured to the carriage and riding on the top and bottom surfaces of the rails 21 to prevent the carriage from jumping the track. The space between the tracks is narrower than carriage and wheels are recessed under the carriage to minimize the possible interference from peat spillage on tracks as will be described.

Rubber pointed stops 21a and 21b are mounted at each end of the track to stop the carriage. Each stop is adjustable in position so that exact point of carriage start position and carriage full forward position can be set.

The carriage 20 is reciprocated on the guide rails 21 by means of a carriage actuator 23 (FIGS. 1 and 10) engaged to a bracket on the bottom thereof. The carriage actuator arm 23 is pivotally mounted on the machine frame 11 by a link 24. The other end of the actuating arm 23 is engaged with the carriage bracket within an elongated slot connection 25. A pneumatic double acting power piston 26, mounted on the machine frame 11, is operatively engaged to the carriage actuating arm 23. A biasing spring 27 is engaged between the machine frame 11 and the lower disposed end of the carriage actuating arm 23.

A work bed platen 30 (FIG. 10) is provided on the carriage member 20. The work platen 30 includes a horizontal work bed surface 31 intermediate the ends which are formed into the special rounded shaped forward end 32a and rearward end 32b. Leaf spring retaining members 50 are secured to the end of the carriage, as shown in FIG. 6. These members extend over the end 32b to hold and retain the packaged object after it has been wrapped up on the machine.

Figure 10:
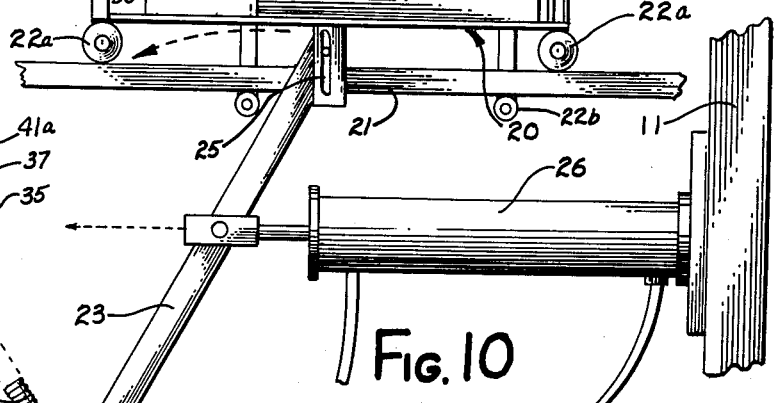
FIG. 10 is an enlarged side plan view of the carriage operating mechanism of the disclosed machine.

On each side of platen end 32a is a notched plate provided to contain the packing material before the rolling operation is started sufficiently to compress and hold it. In FIG. 13 it will be seen that the plate 34 is notched to make clearance for the stem of the plant (the foliage is not wrapped). FIG. 10 shows plate 35 with a different notch. This notch is a compromise. A solid plate would completely prevent spillage but a partial notch is necessary to provide clearance for the cover material which extends out beyond the apron and platen and is later tucked in to cover the bottom of the package. A very narrow sharp slot would not be possible because this would prevent the protruding cover material from revolving with the package.

Connecting the two plates 34 and 35 is a bracing member 37. Each plate stop also has a flange 36 (FIG. 14) fastened on the inside shown by dashed curved lines. These flanges support the pocket formed by the apron and also prevent excessive spillage of packing material between the apron and the plates.

It is realized that the peat stop plates are not perfect in that they do not completely prevent spillage. The notches must be there and material does spill through them but only a small amount compared to a machine without stops.

A wrapping apron 40 is provided on the carriage 20 and is intended to be laid out over the work bed platen 30 thereof. The apron is secured at the front of the carriage to the shaft 41a supported by the two uprights. The horizontal and vertical positions of this shaft are very important to the rolling operation as will be explained later. Shaft 41a can be unscrewed to permit replacement of apron. The rear end of apron is secured to retaining standards 41b at the ends of the carriage. This is preferably such as is shown by FIG. 6. The end of the apron is folded over at each end and the overlapping portions 43 are stitched as at 44. A roller 45 is disposed through the bite at the end of the apron and is vertically adjustable by raising or lowering the standards. The standards 41b are held in position by clamp blocks 44 and thumb screw locking means 45.

As will be described later, the wrapping apron 40 is laid out over the work bed platen 30 of the carriage 20 and is formed to provide a work receiving pocket 48 therein (FIGS. 10 and 12).

A work performing roller assembly 60, best shown in FIGS. 5 and 10, is mounted on the machine frame 11 and has the work performing end disposed for engagement with the carriage member as it travels under the roller assembly 60. Support arms 61 are pivotally engaged to the machine frame 11 on a supporting bar 62. A roller member 63 is provided on the free ends of the support arms 61. The roller 63 is vertically adjustable by means of support rods 64. Support rods 64 are spring loaded so as to exert adjustable resisting pressure to upward movement. Adjustment is also provided for vertical setting of roller assembly. These adjustments provide for obtaining proper position and contact with the carriage and rolling pocket.

Having described the work bed platen 30, wrapping apron 40, leaf spring retaining members 50, and roller 60 the relative positions and relationships of these components will now be described. In the starting position the roller is located forwardly of the sloped end 32a of platen 30 and the apron with the proper amount of slack forms a pocket between the roller and end 32a the plates 34 and 35 providing side walls for the pocket. The apron also rests on the flanges 36 of the plates 34 and 35 (FIG. 10).

The forward end 32a is shaped so that as the carriage moves forward the apron is drawn over and envelopes the plant roots and packing material compressing the same against the end 32a. The roller and end 32a are also so positioned and arranged that the gap between them is swiftly closed preventing excessive waste of packing material. Further, it should be evident from the drawing (FIGS. 10 and 12) that the initial position of the roller 63 and end 32a control the size of the pocket. It should be understood that this pocket is sufficiently wide for receiving and holding the plant roots and packing material but at the same time is sufficiently narrow to permit closing of the gap between the roller and end 32a in a relatively short operating movement of the carriage.

The rearward end 32b of platen 30 is sloped downwardly in such a shape so as to discharge the finished package by dropping it below the roller as the carriage reaches its extreme forward position. It does so without releasing the pressure on the apron and contents thereby permitting the spring fingers 50 to catch the package and hold it without the cover material being loosened.

The position of the apron attachment at shaft 41a with respect to the roller 63 is important because it affects the slackness or effective length of the apron during the work cycle. At the start of the operation a sizable pocket is desired to contain the spongy loose packing material and to provide sufficient space for inserting the plant. However, when the carriage moves forward to form and roll the package, the pocket must be closed and compressed. Initial forward motion of the carriage closes the pocket and presses it under and behind the roller (FIGS. 12f and 12g). This action shortens the apron because the apron now covers more surface of the roller. Obviously the diameter of the roller is a controlling dimension. This shortening action would be too extreme at first, resulting in packing material being squeezed out before the pocket was closed. However, to compensate, the shaft 41a is placed lower than the top of the roller so that more slack is inserted at the beginning of the carriage movement. This can be seen by considering the length of apron between shaft and roller as the hypotenuse of a right triangle. Now every inch of carriage motion (to the left) adds an equal distance to the horizontal component of this triangle but does not add as much to the hypotenuse or apron length on the left of the roller, therefore slack is added to the pocket. Proper positioning of the shaft, therefore, is necessary to the successful operation of this machine.

The feed hopper 70 (FIGS. 2 and 3) includes a compartment space 71 within which may be disposed the packaging material, such as peat moss, for plants, shrubs and the like. A vaned agitator 73 is mounted within the feed hopper 70. Two control gates 74 are provided at the bottom of the agitator and between the hopper and a shuttle box 75, one gate for each compartment of the shuttle box. The shuttle box 75 is reciprocated back and forth under the feed hopper by means of a control piston 76. The double acting control piston 76 is mounted on the machine frame 11, although this is not shown. The shuttle box 75 includes an access opening 77 in its upper surface equal in size to one half the bottom area of the hopper and equal sized openings 78 and 79 at spaced positions in its bottom surface. Chamber spaces 81 and 82 are provided within the base of hopper 70. Guide chutes 83 and 84 are provided under the shuttle box 75. As the box 75 is moved back and forth the chambers 81 and 82 are alternately filled and depleted from the compartment space 71. A center divider plate 89 is provided to prevent packing material from being thrown too far in opposite directions from the chutes 83 and 84. A cross wire 89a is fastened across the chutes to break up and spread the packing material as it drops.

Figure 8:
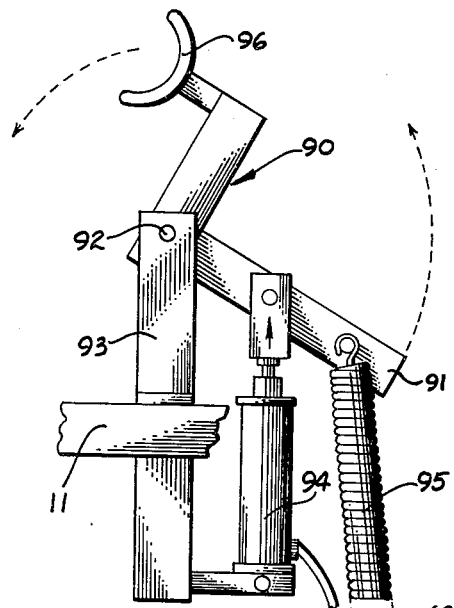
FIG. 8 is an enlarged side plan view of an operating part of the proposed machine shown by itself for better illustration.
Figure 9:
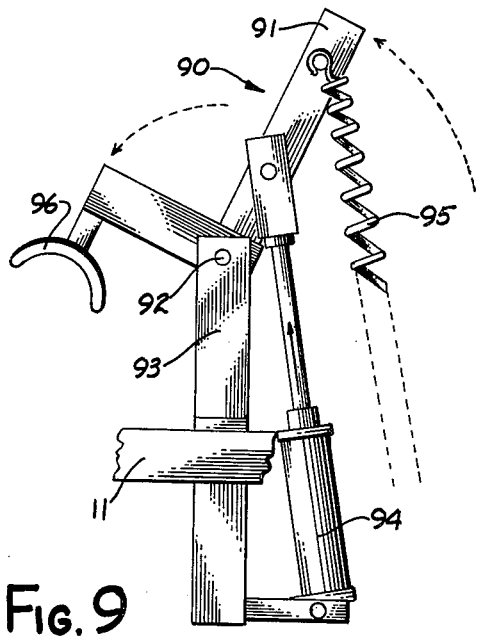
FIG. 9 is similar to FIG. 8 with the operating part shown in a work performing position.

The pocket forming and work tamping device 90 is best shown in FIGS. 8 and 9. Such device includes a bell crank link 91 pivotally supported at 92 on a support arm 93 which is secured to the machine frame 11. A power cylinder 94 is connected to the control arm of the bell crank link 91. A return spring 95 is also connected to the control arm of the bell crank link 91 and serves to bias the work mechanism in a retracted position. A semi-cylindrical shaped member 96 is provided on the other end of the bell crank link 91 and serves as the pocket forming member and the balling head for the device when used as a tamper.

The sequencing or timing controls 100 (FIG. 4) are mounted and disposed within the support area 14 on the machine frame 11. A drive motor 101 is provided and is connected by a belt 102 to an angle drive unit 103. A plurality of sequencing control disks 104 are provided on the drive shaft 105 which extends from the angle drive unit. Timing cams or lugs 106 are provided on the disks 104. A compressed air manifold 107, connected to a supply source, is provided and includes a plurality of take off lines 108. Control valves 109 are provided within the take off lines 108. Connecting lines 110 extend beyond the control valves 109 to the different power actuators 26, 76 and 94. Exact timing of all machine operations can be readjusted and set on disks 104.

Figure 11:
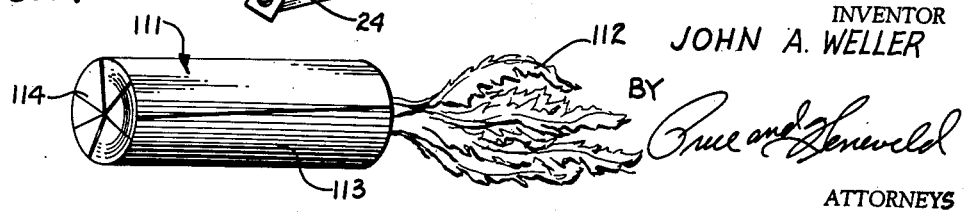
FIG. 11 is a perspective view of a packaged plant as received from the disclosed machine.

FIG. 11 shows the packaged nursery plant 111 as received from the packaging machine 10. The foliage 112 is exposed and the cover material 113 completely encases the root structure of the plant. The cover material is preferably a tar paper or other moisture resistant material. The bottom end of the rolled cover material 113 is folded over and closed as at 114.

*Operation*

The operation of the disclosed packaging machine 10 is best understood by following the sequence of operation (a) through (i) in FIG. 12. However, the details of the various subassemblies are best shown by the other drawings.

FIG. 12 (a) shows the position of the apparatus after the completion of a sequence of operations and previous to the start of another. The carriage 20 is shown disposed at the right of the feed hopper 70. The wrapping apron 40 is laid out over the work platen 30 of the carriage member. It also extends over the roller 60. The pocket forming or tamper member 90 has provided the work receiving pocket 48 within the work apron 40.

The cover material 113 is first placed on the apron 40 with one end in the pocket 48. A control switch is then actuated by the operator causing the hopper 70 to dispense peat moss in pocket 48. The control gate 74 is assumed to have been previously set, with respect to the access opening 77 in the shuttle box, for the proper amount aggregate. The vaned agitator 73 helps to keep the peat moss from becoming compacted within the feed hopper and to fall towards the lower end thereof. In some instances more or less aggregate of peat moss may be required than in other instances. Accordingly, the feed control gate 74 enables regulation of the size of the access opening 77 to the shuttle box dispenser 75 for work regulation purposes.

The shuttle box 75 is reciprocated under the feed hopper 70 to alternately receive peat moss within one of the spaces 81 or 82 and to dispense a like quantity from the other end thereof.

Immediately after the first amount of peat moss is received within the apron pocket 48, the plant which is to be wrapped up is disposed with its root structure within the apron pocket 48 and with its foliage extending therebeyond. This is done by the operator standing behind the machines as shown in FIG. 1. Therefore, the foliage of the plant is located outside the pocket 48 and points toward the operator. This is made possible by the notch in plate 34 (FIG. 13).

Thereafter, more peat moss 72 is dispensed from the feed hopper 70 to cover the root structure of the plant and to fill the apron pocket 48. In a completely automated cycle the dispensing of the peat moss 72 from the feed hopper 70 is timed to allow a person to place a plant properly within the receiving pocket of the apron prior to the last mentioned dispensing operation.

As shown in FIG. 12 (d) the tamper member 90 is next actuated to tamp and compact the peat moss 72 into the cylindrical shape shown in FIG. 12 (e).

The sequence of carriage operation is shown in FIG. 12 (f) through (i). Carriage movement is initiated by the actuating arm 23 under the influence of the power cylinder 26. The carriage 20 travels on the guide rails 21 in the direction of the arrows shown. In doing so, the carriage 20 passes under the work roller 60. This causes the wrapping apron 40 to be closed and tightened over the pocket 48 which includes the plant roots and moisture retaining peat moss material 72.

Continued operation of the carriage 20 causes the pocket forming slack material in the working apron 40 to be pulled on top of the work bed platen 30. This disposes the pocket portion 48 of the apron behind the work roller 60. As the working apron 40 is pulled through the pocket portion by the relative movement of the carriage 20 with respect to the work roller 60 the root structure of the plant and its covering peat moss 72 is wrapped up within the covering material 113.

In FIG. 12 (h) the carriage 20 is shown as it arrives in its furthest advanced position to the left of the feed hopper 70. The packaged plant 111 is shown as received at the end of the work carriage 20 within the spring leaf plant retainers 50. Thereafter, as the carriage is returned to its retracted position, by means of the biasing spring 27, alone or in combination with the power cylinder, the packaged plant remains engaged with the leaf spring retainers 50 and the working apron 30 is laid out over the work bed platen 30 of the carriage member 20. The packaged plant is then ready for removal.

The power cylinder 94 is then activated (by means of one of the control disks 104) and the work head of the tamper is pivoted down against the apron 40. The tamping head forms the pocket 48 forwardly of the end 32a of the work platen 30 and directly under the feed hopper 70 (shown in FIG. 12a).

The tamper 90 is returned immediately thereafter to its original position. This may be acomplished by means of a double acting power cylinder 94 and assisted by the return biasing spring 95 or by a single acting cylinder with spring return. The machine is then ready for receiving another wrapper.

It will be appreciated that the disclosed wrapping machine 10, once set up, requires only that an operator stand by to place the wrapper on the apron and the plant within the feed pocket 48 of the work apron 40 after the first quantity of peat moss is dispensed within the pocket. With an adequate supply of wrappers and of peat moss in the feed hopper 70 and sufficient nursery stock on hand, a great many plants may be properly and efficiently wrapped in a very short period of time. The timing cycle may enable one operator to fold in the ends of the packaged plant or may be speeded up where a two man operation is desired.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A packaging machine, comprising; a supporting frame, a reciprocal carriage mounted on said frame, power motor means operatively connected between said frame and said carriage to reciprocate said carriage, said carriage including a work bed platen near one end thereof, a roller mounted on said frame and yieldably biased in a downwardly direction toward said platen and disposed near the other end of said carriage and for engagement with said platen during movement of said carriage thereunder, a wrapping apron having its ends connected to said carriage and being extended over said roller, said apron having sufficient slack to form a work receiving pocket therein between said roller and said platen, and linkage means cooperating with said power motor means for reciprocating said carriage under said roller for closing said pocket and wrapping a sheathing material received in said pocket about an item placed thereon.

2. A packaging machine, comprising; a supporting frame including a pair of carriage guide tracks forming a work carriage support at work table height, a reciprocal work carriage mounted on said guide rails, said carriage including a work bed platen near one end thereof, a roller supporting arm member pivotally mounted on said frame and including a work roller member near the free end thereof, compensating tie bar means between said roller supporting arm member and said frame for yieldingly holding said roller disposed for engagement with said work carriage platen as it travels thereunder, a wrapping apron having its ends connected to said carriage and being extended over said roller, said apron having sufficient slack to provide work receiving pockets therein at the ends of said work platen, and carriage actuating means engaged to said carriage for reciprocating said carriage on said guide rails under said roller and to a return position.

3. A packaging machine, comprising; a supporting frame, a reciprocal carriage mounted on said frame, said carriage including a work bed platen near one end thereof, a roller mounted on said frame and disposed near the other end of said carriage and for engagement with said platen during movement of said carriage thereunder, a wrapping apron having its ends connected to said carriage and being extended over said roller, said apron having sufficient slack to form a work receiving pocket therein between said roller and said platen, means for reciprocating said carriage under said roller for closing said pocket and wrapping a sheathing material received in said pocket about an item placed thereon, a feed hopper for packaging materials provided on said frame and disposed over said work receiving pocket, pocket forming and work tamping means mounted on said frame, and an operative interconnection between said feed hopper and said last mentioned means for automatically forming said pocket, dispensing packaging material precedent and subsequent to the receipt of said item therein, and thereafter tamping said packaging material about said item.

4. A plant packaging machine, comprising; a machine frame including guide track means and having a work carriage mounted for reciprocal travel thereon, said carriage including a wrapping apron secured to the ends of said carriage, a roller mounted on said frame and disposed for engagement with said work carriage as said carriage is reciprocated thereunder, said apron including sufficient slack to be received over said roller and to provide work receiving pockets therein near the ends of carriage, a pocket forming member pivotally engaged to said frame and disposed in pocket forming relation to said work carriage in its retracted position, work carriage actuating means; an operative interconnection between said work carriage actuating means and said pocket forming member for sequencing the operation of said pocket forming member to provide a work receiving pocket in said apron, to be withdrawn to allow for work to be deposited within said pocket, to advance and withdraw said pocket forming member again to compact said work within said pocket, and to activate said carriage actuating means to reciprocate said carriage under said roller for closing said work receiving pocket and advancing said closed pocket towards the other end of said carriage.

5. A plant packaging machine, comprising; a machine frame including guide track means and having a work carriage mounted for reciprocal travel thereon, said carriage including a wrapping apron secured to the ends of said carriage, a roller mounted on said frame and disposed for engagement with said work carriage as said carriage is reciprocated thereunder, said apron including sufficient slack to be received over said roller and to provide work receiving pockets therein near the ends of said carriage, a pocket forming member pivotally engaged to said frame and disposed in pocket forming relation to said work carriage in its retracted position, work carriage actuating means; an operative interconnection between said work carriage actuating means and said pocket forming member for sequencing the operation of said pocket forming member to provide a work receiving pocket in said apron, to be withdrawn to allow for work to be deposited within said pocket, to advance and withdraw said pocket forming member again to compact said work within said pocket, and to activate said carriage actuating means to reciprocate said carriage under said roller for closing said work receiving pocket and advancing said closed pocket towards the other end of said carriage, and spring leaf package retainers provided on one end of said carriage for loosely receiving and retaining said packaged work at the end of the advance travel of said carriage and during the return travel thereof.

6. A plant packaging machine, comprising; a reciprocal work platen carriage having a wrapping apron provided thereon, a roller mounted to receive said carriage thereunder in the course of its reciprocal travel, said roller receiving said apron thereover for forming a work receiving pocket in said apron at the end of said carriage disposed next adjacent thereto in its retracted position; and having in combination therewith a feed hopper for work packaging material and a pocket forming member, said feed hopper being cooperatively disposed over said work receiving pocket formed in said work apron, said pocket forming member being formed and disposed to provide said work receiving pocket within said apron and to subsequently compact packing material received from said feed hopper about work received in said pocket, power motor means on said carriage, said hopper, and said pocket forming member, and intercooperative timing controls between the power means on said carriage, said hopper and said pocket forming member for the automated packaging of work items received within the pocket of said work receiving apron.

7. A plant packaging machine, comprising; a reciprocal work platen carriage having a wrapping apron provided thereon, a roller mounted to receive said carriage thereunder in the course of its reciprocal travel, said roller receiving said apron thereover for forming a work receiving pocket at the end of said carriage which is disposed next adjacent thereto in its retracted position; and having in combination therewith a feed hopper for work packing material and a pocket forming member, said feed hopper being cooperatively disposed over said work receiving pocket formed in said work apron, said feed hopper including means provided at the outlet end thereof for alternately receiving and dispensing packing material in sequence within the pocket of said apron prior and subsequent to the receipt of a work member therein, said pocket forming member being formed and disposed to provide said work receiving pocket within said apron and to subsequently compact packing material received from said feed hopper about work received in said pocket, power means on said carriage, said hopper, and said pocket forming member, and intercooperative timing controls between said carriage, said hopper and said pocket forming member for the automated packaging of work items received within the pocket of said work receiving apron.

8. A plant packaging machine, comprising; a pneumatically operated reciprocal work carriage having a wrapping apron provided thereover, a roller mounted to receive said carriage thereunder in the course of its reciprocal travel, said roller receiving said wrapping apron thereover and being disposed next adjacent the end of said carriage in its retracted position; a pneumatically operated pocket forming and working member disposed to provide a work receiving pocket between said roller and said carriage and to subsequently perform work within said pocket; a feed hopper disposed over said wrapping apron for discharging packaging material into the work receiving pocket formed within said apron, said hopper including a pneumatically operated feed control mechanism for dispensing packaging material precedent and subsequent to the receipt of an object within said apron pocket, and said hopper including an agitator for feeding packaging material to said feed control mechanism; and a timing mechanism for sequencing the operation of said packaging machine and including, drive means connected to a power source, timing cams driven by said drive means, and pneumatic connections between a supply source and with said pneumatically operated carriage said pocket forming and working member and said hopper feed control mechanism, said pneumatic connections including therein control valves operatively disposed for actuation in preselected sequence by said timing cams, and a power take off from said drive means operatively connected to said agitator; said machine being timed to have a pocket formed in said apron, to receiving packaging material in said pocket precedent and subsequent the disposal of an object to be packaged therein, to form said subsequently received material about said object, and to cause said object to be wrapped up in the course of reciprocating said carriage.

9. A packaging machine, comprising: a supporting frame, a reciprocal carriage mounted on said frame, said carriage including a work bed platen near one end thereof, a roller mounted on said frame and disposed near the other end of said carriage and for engagement with said platen during movement of said carriage thereunder, a wrapping apron having one end connected directly to said carriage and the second end connected indirectly to said carriage through a vertically adjustable member, and being extended over said roller, said adjustable member capable of adjusting the slack of said apron for adjusting the size and tightness of package, said apron having sufficient slack to form a work receiving pocket therein between said roller and said platen, and means for reciprocating said carriage under said roller for closing said pocket wrapping a sheathing material received in said pocket about an item placed thereon.

10. A packaging machine, comprising: a supporting frame, a reciprocal carriage mounted on said frame, said carriage including a work bed platen near one end thereof, a roller yieldably mounted on said frame and disposed near the other end of said carriage and for engagement with said platen during movement of said carriage thereunder, connecting means between said roller and said frame for adjusting the vertical position of said roller with respect to said bed platen a wrapping apron having its ends connected to said carriage and being extended over said roller, said apron having sufficient slack to form a work receiving pocket therein between said roller and said platen, and means for reciprocating said carriage under said roller for closing said pocket wrapping a sheathing material received in said pocket about an item placed thereon.

11. A packaging machine, comprising: a supporting frame, a reciprocal carriage mounted on said frame, said carriage including a work bed platen near one end thereof, a roller mounted on said frame and disposed near the other end of said carriage and for engagement with said platen during movement of said carriage thereunder, a wrapping apron having its ends connected to said carriage and being extended over said roller, said apron having sufficient slack to form a work receiving pocket therein between said roller and said platen, a plate on each side of said apron between said roller and platen for containing material to be wrapped within said work receiving pocket one of said plates having a slot shaped for receiving a wrapper and the other of said plates having a slot shaped for receiving the stem and foliage of a plant.

12. A packaging machine, comprising: a supporting frame, a reciprocal carriage mounted on said frame, said carriage including a work bed platen near one end thereof, a roller mounted on said frame and disposed near the other end of said carriage and for engagement with said platen during movement of said carriage thereunder, a wrapping apron having its ends connected to said carriage and being extended over said roller, said apron having sufficient slack to form a work receiving pocket therein between said roller and said platen, said platen having a sloped end adjacent said roller and a depression in the end opposite thereto, said sloped end forming a backing for said apron to form the work receiving pocket and also providing a surface on which the pocket is rolled compressing the material therein, said depression forming a receptacle for the final package, and spring retaining means extending over said depression for retaining the final package therein for removal by an operator.

13. A packaging machine, comprising; a supporting frame, a reciprocal carriage mounted on said frame, said carriage including a work bed platen near one end thereof, a roller mounted on said frame and disposed near the other end of said carriage and for engagement with said platen during movement of said carriage thereunder, a wrapping apron having its ends connected to said carriage and being extended over said roller, said apron being connected at its ends to the carriage at points located at a level substantially lower than said roller providing sufficient slack to form a work receiving pocket therein between said roller and said platen, and means for reciprocating said carriage under said roller for closing said pocket and wrapping a sheathing material received in said pocket about an item placed thereon.

14. A packaging machine, comprising; a supporting frame including means forming a work carriage support, a work carriage mounted on said means, said carriage including a work bed platen near one end thereof, a roller supporting means mounted on said frame and including a work roller member means for yieldingly holding said roller disposed for engagement with said work carriage platen as it travels thereunder, a wrapping apron having its ends connected to said carriage and being extended over said roller, said apron being connected at its ends to the carriage at points located at a level substantially lower than said roller, said apron having sufficient slack to provide work receiving pockets therein at the ends of said work platen, and carriage actuating means engaged to said carriage for moving said carriage under said roller and to a return position.

References Cited in the file of this patent
UNITED STATES PATENTS

| | | |
|---|---|---|
| 2,129,997 | Enfield | Sept. 13, 1938 |
| 2,298,086 | Rogers | Oct. 6, 1942 |
| 2,795,093 | Ott | June 11, 1957 |